United States Patent
Wittmeier et al.

(10) Patent No.: US 12,181,725 B2
(45) Date of Patent: *Dec. 31, 2024

(54) BUTT CLOSURES AND ORGANIZER ASSEMBLIES THEREFOR

(71) Applicant: AFL Telecommunications LLC, Duncan, SC (US)

(72) Inventors: David Wittmeier, Greer, SC (US); David Lane, Chesnee, SC (US); Cecilia Stout, Greer, SC (US); William Miller, Easley, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,738

(22) Filed: Sep. 26, 2022

(65) Prior Publication Data

US 2023/0014214 A1    Jan. 19, 2023

Related U.S. Application Data

(63) Continuation of application No. 17/055,080, filed as application No. PCT/US2019/032120 on May 14, 2019, now Pat. No. 11,487,071.

(60) Provisional application No. 62/812,632, filed on Mar. 1, 2019, provisional application No. 62/671,132, filed on May 14, 2018.

(51) Int. Cl.
*G02B 6/44* (2006.01)

(52) U.S. Cl.
CPC ......... *G02B 6/4455* (2013.01); *G02B 6/4442* (2013.01); *G02B 6/4454* (2013.01)

(58) Field of Classification Search
CPC .................................................. G02B 6/4454
See application file for complete search history.

(56) References Cited

U.S. PATENT DOCUMENTS

| | | | |
|---|---|---|---|
| 5,185,845 | A | 2/1993 | Jones |
| 5,222,183 | A | 6/1993 | Daems |
| 5,323,480 | A | 6/1994 | Mullaney |
| 5,363,466 | A | 11/1994 | Milanowski |
| 5,479,553 | A | 12/1995 | Daems |

(Continued)

FOREIGN PATENT DOCUMENTS

| | | |
|---|---|---|
| EP | 0367477 A2 | 5/1990 |
| EP | 0490644 A1 | 6/1992 |

(Continued)

*Primary Examiner* — Charlie Y Peng
(74) *Attorney, Agent, or Firm* — Dority & Manning, P.A.

(57) ABSTRACT

An organizer assembly includes a primary basket extending along a longitudinal axis between a first open end and a second closed end, the primary basket defining an interior. The organizer assembly further includes a bracket assembly extending along a transverse axis at the first open end of the basket, the bracket assembly including a plurality of hinge assemblies. The organizer assembly further includes a plurality of organizer trays, each of the plurality of organizer trays rotatably connectable to the bracket assembly at one of the plurality of hinge assemblies. Each of the plurality of organizer trays is rotatable between a first position wherein the organizer tray is aligned along the longitudinal axis and a second position wherein the organizer tray is aligned along the transverse axis.

21 Claims, 14 Drawing Sheets

(56) References Cited

U.S. PATENT DOCUMENTS

| | | | |
|---|---|---|---|
| 5,530,786 A * | 6/1996 | Radliff | G02B 6/4471 385/136 |
| 5,566,269 A * | 10/1996 | Eberle, Jr. | G02B 6/4471 385/136 |
| 5,758,004 A | 5/1998 | Alarcon | |
| 6,009,224 A * | 12/1999 | Allen | G02B 6/4455 385/135 |
| 6,201,921 B1 | 3/2001 | Quesnel et al. | |
| 6,418,266 B1 | 7/2002 | Vitantonio | |
| 6,434,313 B1 | 8/2002 | Clapp, Jr. | |
| 6,453,107 B1 | 9/2002 | Daoud | |
| 6,507,691 B1 | 1/2003 | Hunsinger | |
| 7,333,706 B2 | 2/2008 | Allen | |
| 7,418,183 B2 | 8/2008 | Wittmeier | |
| 7,684,669 B2 | 3/2010 | Bayazit | |
| 7,697,812 B2 | 4/2010 | Parikh | |
| 7,715,680 B2 | 5/2010 | Krampotich | |
| 7,734,138 B2 * | 6/2010 | Bloodworth | G02B 6/3897 385/86 |
| 7,936,960 B2 | 5/2011 | McGranahan | |
| 8,254,742 B2 | 8/2012 | Womack | |
| 8,554,044 B2 | 10/2013 | Bran De Leon | |
| 9,140,870 B2 | 9/2015 | Marmon | |
| 9,207,422 B2 | 12/2015 | Ray | |
| 9,494,760 B2 | 11/2016 | Simmons | |
| 9,513,451 B2 | 12/2016 | Desard | |
| 9,575,274 B2 | 2/2017 | Allen | |
| 9,709,766 B2 | 7/2017 | Claessens et al. | |
| 10,048,460 B2 * | 8/2018 | Courchaine | G02B 6/444 |
| 10,241,287 B2 | 3/2019 | Dobbins et al. | |
| 10,247,896 B2 | 4/2019 | Kerry et al. | |
| 10,641,980 B2 | 5/2020 | Sledzinski | |
| 10,670,821 B2 | 6/2020 | Claessens et al. | |
| 2008/0085094 A1 | 4/2008 | Krampotich | |
| 2009/0185782 A1 | 7/2009 | Parikh | |
| 2015/0253528 A1* | 9/2015 | Corbille | G02B 6/4471 385/135 |
| 2015/0268436 A1 | 9/2015 | Blackwell, Jr. | |
| 2019/0265426 A1 | 8/2019 | Zhejian et al. | |

FOREIGN PATENT DOCUMENTS

| | | | |
|---|---|---|---|
| EP | 2535750 B1 | 5/2014 | |
| JP | 2001324621 A | 11/2001 | |
| KR | 101239896 B1 | 3/2013 | |
| WO | WO2007139823 A2 | 12/2007 | |
| WO | WO-2013149667 A1 * | 10/2013 | G02B 6/4454 |
| WO | WO2015095365 A1 | 6/2015 | |
| WO | WO2018231956 A1 | 12/2018 | |
| WO | WO2019123496 A1 | 6/2019 | |
| WO | WO2019158725 A1 | 8/2019 | |
| WO | WO2019158727 A1 | 8/2019 | |
| WO | WO2019212887 A1 | 11/2019 | |
| WO | WO2019222148 A3 | 11/2019 | |
| WO | WO2020011608 A1 | 1/2020 | |
| WO | WO2020014204 A1 | 1/2020 | |
| WO | WO2020040913 A1 | 2/2020 | |
| WO | WO2020061144 A1 | 3/2020 | |
| WO | WO2020157117 A1 | 8/2020 | |
| WO | WO2020205569 A1 | 10/2020 | |
| WO | WO2020223473 A1 | 11/2020 | |
| WO | WO2020225824 A1 | 11/2020 | |
| WO | WO2020243284 A1 | 12/2020 | |

* cited by examiner

BUTT CLOSURES AND ORGANIZER ASSEMBLIES THEREFOR

PRIORITY STATEMENT

This application is a continuation of U.S. patent application Ser. No. 17/055,080 filed on Nov. 12, 2020, which is a National Stage Patent Application of PCT/US2019/032120, filed on May 14, 2019, which claims the benefit of priority to U.S. Provisional Patent Application Ser. No. 62/671,132, filed May 14, 2018, and to U.S. Provisional Patent Application Ser. No. 62/812,632, filed Mar. 1, 2019, each of which are incorporated by reference herein in their entireties.

FIELD

The present disclosure relates generally to closures, such as for fiber optic cable connections, and more specifically to improved organizer assemblies for butt closures.

BACKGROUND

Certain closures, also referred to as "butt" or "domed" closures, are utilized in outdoor environments to facilitate the connection of transmission cables such as fiber optic cables. The cables enter the closure through a sealed base, and connection of the cable elements occurs within the closure. In the case of fiber optic cables, spliced-together optical fibers are held within the closure.

Many fiber organizer assemblies utilized in known butt closures generally have edges that can cause buffer tubes to kink if they are pulled over these edges. Further, in many cases, trays of the organizer assemblies must be held in the vertical or up position while other trays are being populated with fiber and while splicing is being done. Still further, splice modules utilized in such trays provide limited flexibility with respect to the types of splices and/or other components that can be held therein.

Accordingly, improved organizer assemblies for use with butt closures would be advantageous. Specifically, organizer assemblies which address one or more of the above-stated deficiencies would be advantageous.

BRIEF DESCRIPTION

Aspects and advantages of the invention will be set forth in part in the following description, or may be obvious from the description, or may be learned through practice of the invention.

In accordance with one embodiment, an organizer assembly for a butt closure is provided. The organizer assembly defines a mutually orthogonal coordinate system which includes a longitudinal axis, a lateral axis, and a transverse axis. The organizer assembly includes a primary basket extending along the longitudinal axis between a first open end and a second closed end, the primary basket defining an interior. The organizer assembly further includes a bracket assembly extending along the transverse axis at the first open end of the basket, the bracket assembly including a plurality of hinge assemblies. The organizer assembly further includes a plurality of organizer trays, each of the plurality of organizer trays rotatably connectable to the bracket assembly at one of the plurality of hinge assemblies. Each of the plurality of organizer trays is rotatable between a first position wherein the organizer tray is aligned along the longitudinal axis and a second position wherein the organizer tray is aligned along the transverse axis.

In accordance with some embodiments, each of the plurality of organizer trays includes a plurality of positioning slots and a positioning tab. The positioning tab of one of the plurality of organizer trays is inserted in one of the plurality of positioning slots of a neighboring organizer tray when the plurality of organizer trays is in the first position. The positioning tab of the one of the plurality of organizer trays is inserted in another one of the plurality of positioning slots of the neighboring organizer tray when the plurality of organizer trays is in the second position.

In accordance with other embodiments, the organizer assembly further includes a plurality of splice modules removably connected within each of the plurality of organizer trays. Each of the plurality of splice modules includes a base and a plurality of partitions extending from the base. Neighboring partitions of the plurality of partitions define channels therebetween, each channel defining a longitudinal channel axis. Each of the plurality of splice modules further includes one or more arms extending from each neighboring partition into each channel defined by the neighboring partition at an angle to the longitudinal channel axis. The one or more arms extending into a channel from a first partition of the neighboring partitions extend in a direction opposite the direction of the one or more arms extending into the channel from a second partition of the neighboring partitions.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
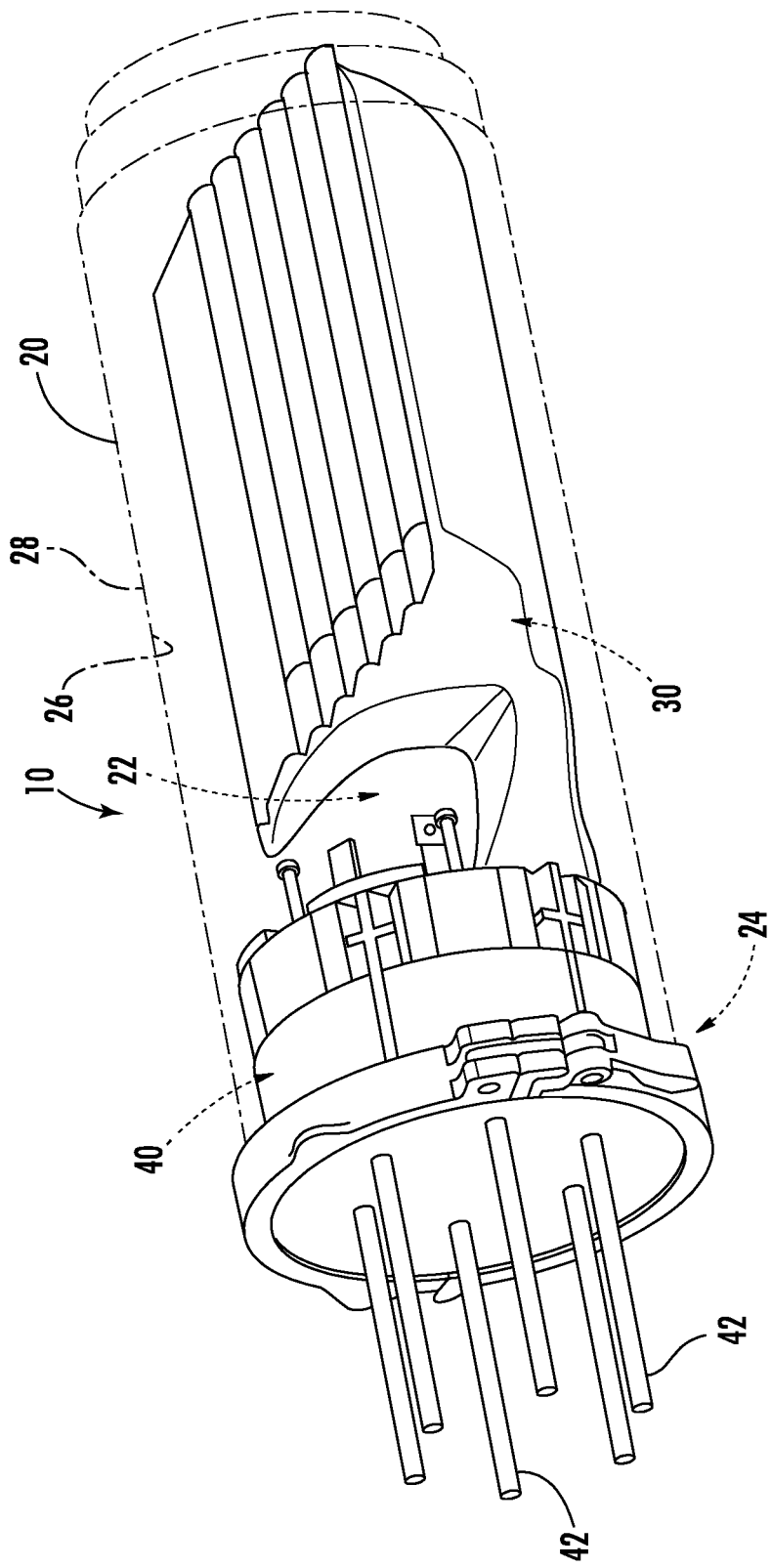
FIG. 1 is a perspective view of a butt closure in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 14, embodiments of butt closures 10 and organizer assemblies in accordance with the present disclosure are provided. Closures 10 in accordance with the present disclosure, and in particular the organizer assemblies thereof, may advantageously provide improved routing features which reduce kinking and attenuation risks. Additionally or alternatively, closures 10 and organizer baskets thereof in accordance with the present disclosure may advantageously provide improved features for securing and positioning organizer trays thereof in a variety of positions, thus advantageously allowing efficient and effective fiber-populating, splicing, etc. Additionally or alternatively, closures 10 and organizer baskets thereof in accordance with the present disclosure, and in particular the splice modules which may be utilized with such closures 10 and/or organizer baskets, may advantageously provide improved flexibility with respect to the types of splices and/or other components that can be held therein.

Referring now to FIG. 1, a closure 10 in accordance with the present disclosure includes a cover 20. Cover 20 is generally a domed cover which defines an interior 22 and an opening 24 which provides access to the interior 22. Cover 20 may include an inner surface 26 which defines the interior 22 and an opposing outer surface 28 which is exposed to the external environment.

An organizer assembly 30 may be insertable into (and thus disposed within) the interior 22, such as along a longitudinal axis of the closure 10. Organizer assembly 30 may include one or more organizer trays 200 and/or other suitable components for facilitating transmission component connections. For example, in the case of use with fiber optic cables, splices between optical fibers thereof may be housed in the various splice trays.

A base 40 may be insertable at least partially into (and thus disposed at least partially within) the interior 22. In some embodiments, organizer assembly 30 may be connected to the base 40, such that insertion of the base 40 causes insertion of the tray assembly 30 into the interior 22. Cables 42 may be inserted through the base 40 into the interior 22, and connection between transmission elements thereof (such as optical fibers) may be made within the interior 22, such as in the organizer trays 200 of the organizer assembly 30.

FIGS. 2 through 14 illustrate various embodiments of organizer assemblies 30 and components thereof in accordance with embodiments of the present disclosure. A mutually orthogonal coordinate system may be defined for organizer assemblies 30 in accordance with the present disclosure, and may include a mutually orthogonal longitudinal axis 102, lateral axis 104, and transverse axis 106.

Figure 2:
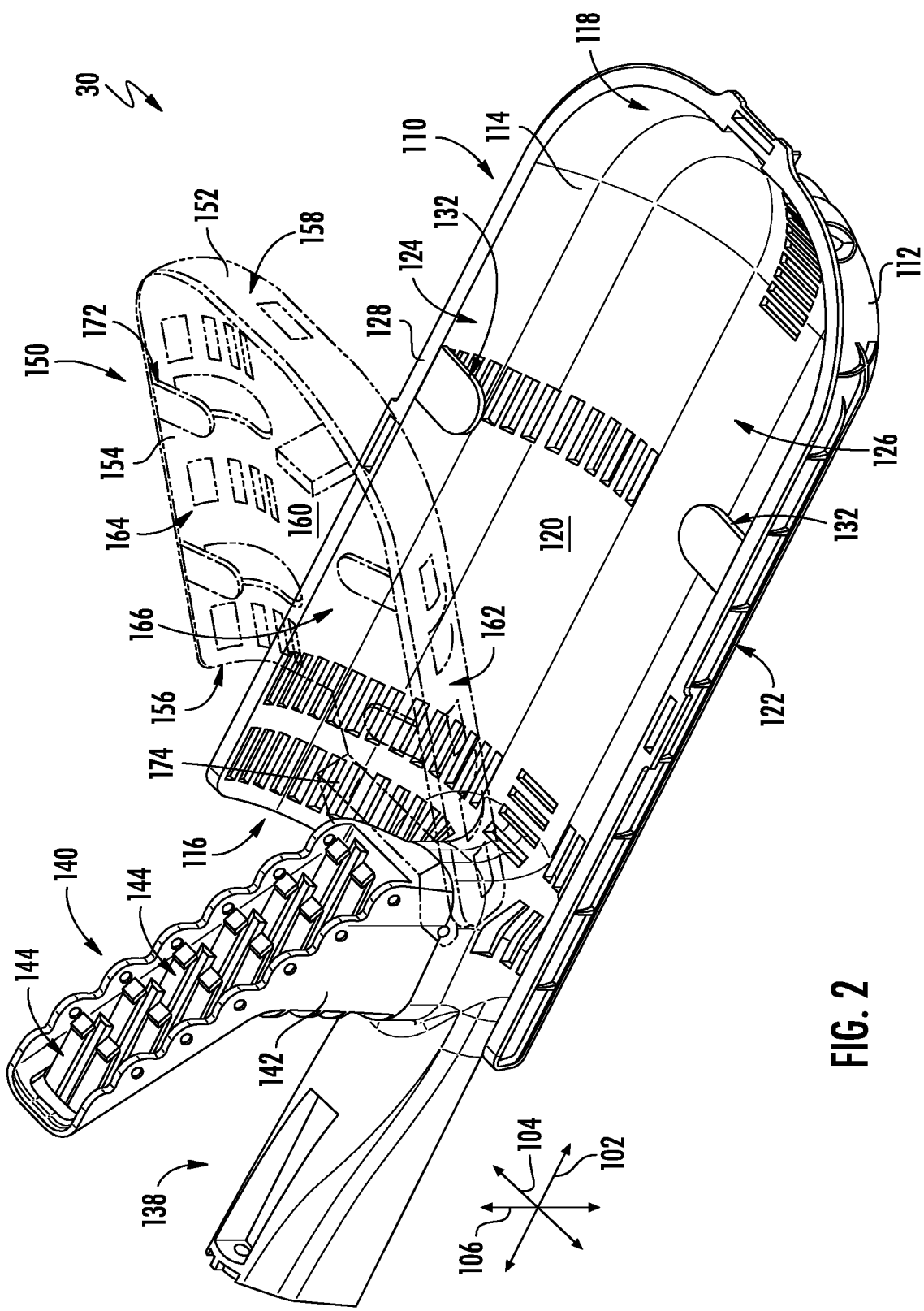
FIG. 2 is a perspective view of an organizer assembly, with a secondary basket connected thereon, in accordance with embodiments of the present disclosure.
Figure 3:
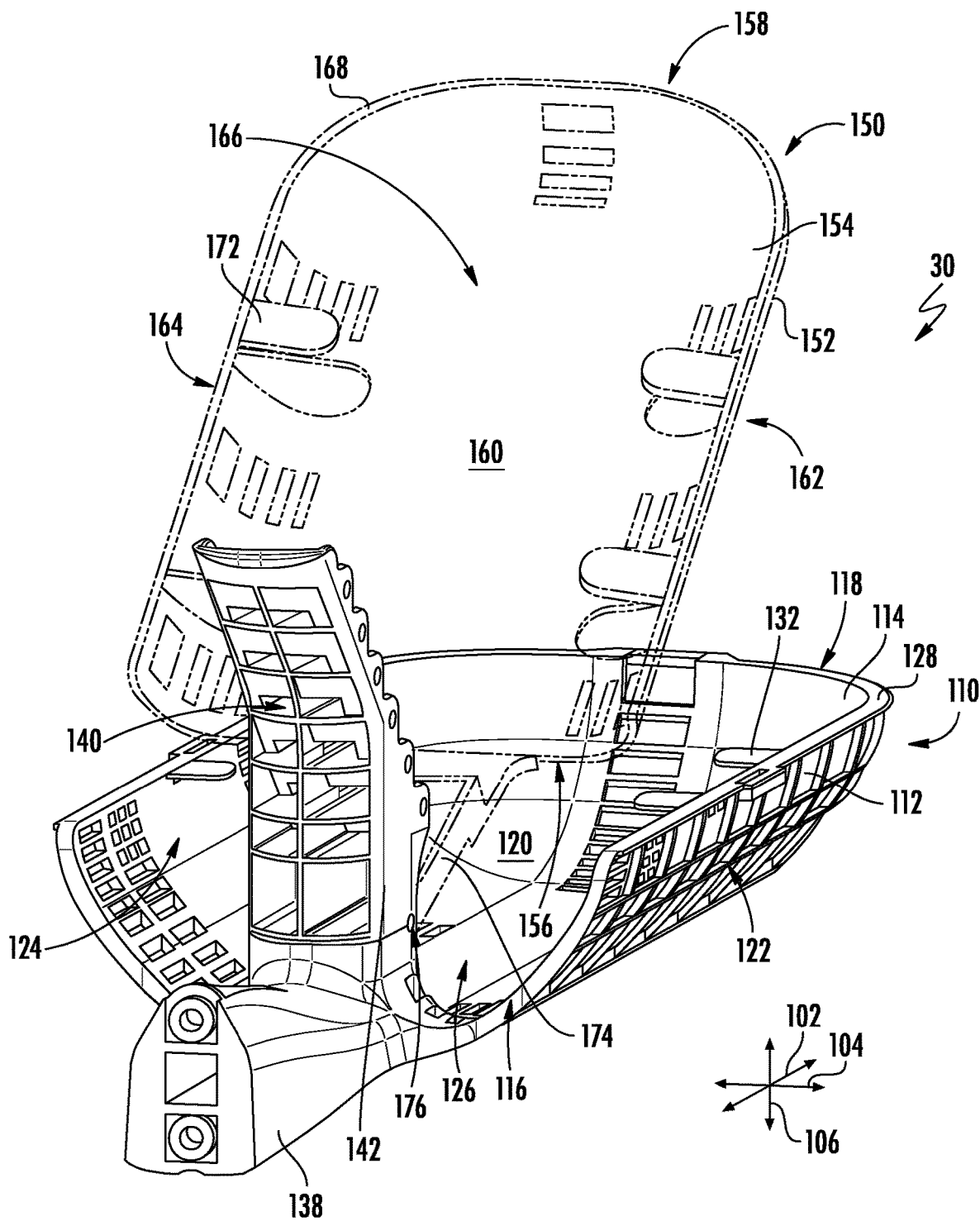
FIG. 3 is a rear perspective view of an organizer assembly, with a secondary basket connected thereon, in accordance with embodiments of the present disclosure.
Figure 4:
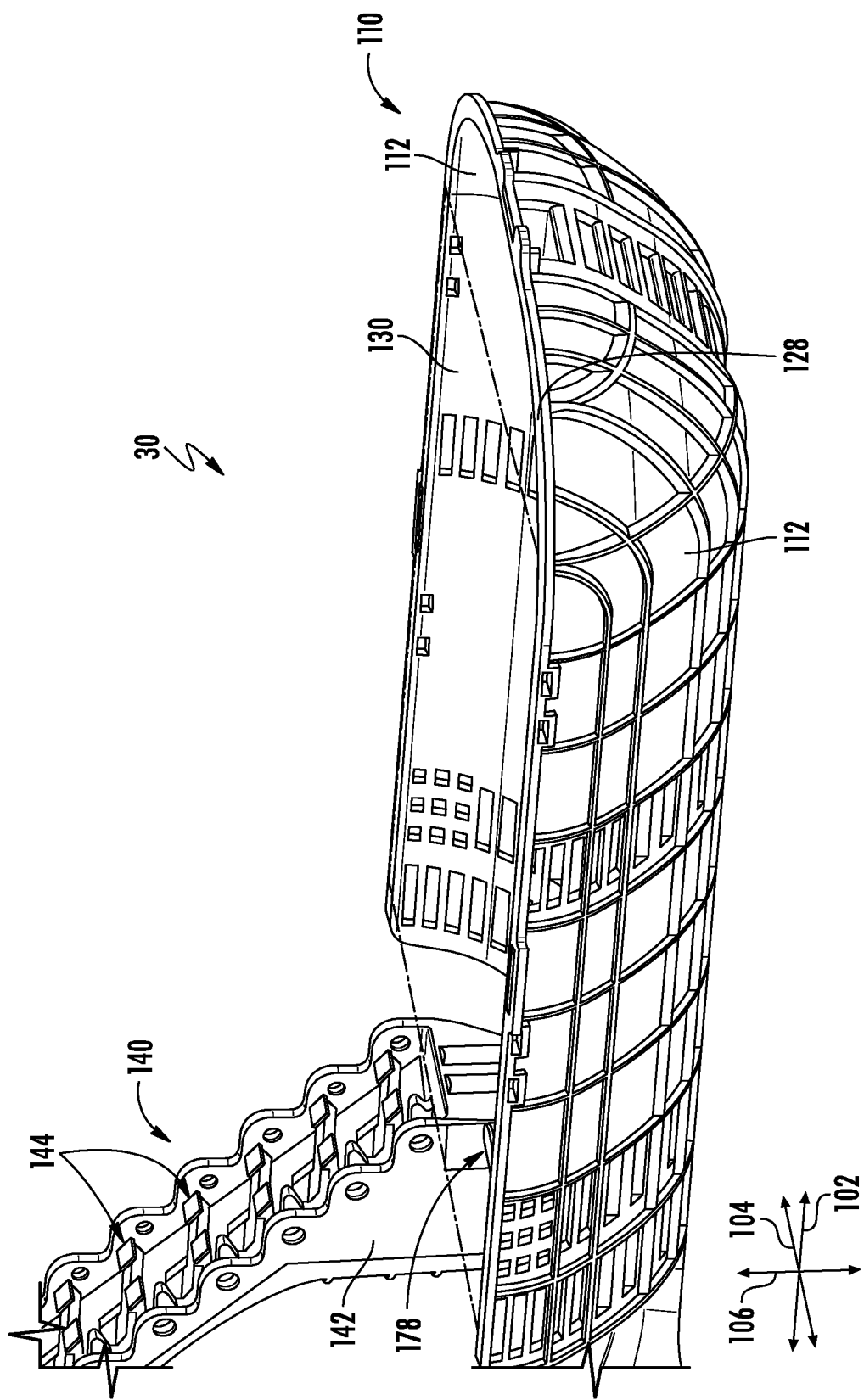
FIG. 4 is a perspective view of an organizer assembly, with a cover plate provided thereon, in accordance with embodiments of the present disclosure.

Referring in particular to FIGS. 2 through 4, organizer assemblies 30 in accordance with the present disclosure may include a primary basket 110. The primary basket 110 generally forms at least a portion of the base exterior of the organizer assembly 30, and includes an exterior surface 112 and an interior surface 114. The primary basket 110 may extend along the longitudinal axis 102 between a first end 116 and a second end 118. The first end 116 may be an open end, as shown, such that cables 42 or transmission elements thereof being directed along and parallel to the longitudinal axis 102 can enter or exit an interior 120 of the primary basket 110 through the first end 116. The second end 118 may be a closed end, as shown, such that cables 42 or transmission elements thereof being directed along and parallel to the longitudinal axis 102 cannot enter an interior 120 of the primary basket 110 through the second end 118, and instead encounter a surface of the primary basket 110.

The primary basket 110 may further extend along the lateral axis 104 between a first side 122 and a second side 124, both of which may be closed (as discussed above with respect to second end 118). In exemplary embodiments, a length between the first end 116 and second end 118 is greater than a length between the first side 122 and the second side 124. Further, in exemplary embodiments, transitions between the closed second end 118 portion and a base portion 126, the closed first side portion 122 and the base portion 126, the closed second side portion 124 and the base portion 126, the closed second end 118 portion and closed first side portion 122, and/or the closed second end 118 portion and closed second side portion 124 are curved.

Basket 110 may generally be utilized to house excess cables 42 and/or transmission elements thereof as the cables 42 and/or transmission elements thereof are routed through the closure 10 and organizer assembly 30 thereof.

Primary basket 110 may further include an upper peripheral lip 128, which may extend between the first end 116 and second end 118, such as on the sides 122, 124, and may further extend between the sides 122, 124, such as along the closed second end 118. For example, the lip 128 may extend along an upper edge (along the traverse axis 106) of the primary basket 110, such as along the sides 122, 124 and second end 118.

In some embodiments, as illustrated in FIG. 4, a cover plate 130 may be provided. Cover plate 130 may be removably positioned on the basket 110, such as on the lip 128 thereof. Hook-and-loop fasteners or other suitable fastening apparatus may be utilized to removably fasten the cover plate 130 to the basket 110. Cover plate 130 may protect and help to secure portions of cables 42 and transmission elements thereof which are disposed in and routed through the interior 120 of basket 110.

In some embodiments, basket 110 may further include a plurality of retainer tabs 132, each of which extends from the basket 110 into the interior 120. The tabs 132 may be connected to the basket 110 at the upper edge of the basket 110, such as adjacent the lip 128. Further, in exemplary embodiments, the tabs 132 are removable. In some embodiments, for example, the tabs 132 may be removed when a secondary basket (as discussed herein) is connected. Tabs 132 may generally assist in routing and retaining cables 42 and transmission elements in the interior 120 during assembly, splicing, etc., thereof.

A connector shaft 138 may extend from the first end 116 along the longitudinal axis 102, such that at least a portion of the connector shaft 138 is exterior to the primary basket 110. The connector shaft 138 may connect to the base 40, thus connecting the organizer assembly 30 and base 40 together.

Referring now in particular to FIGS. 2 through 4 and 6 through 8, a bracket assembly 140 may extend along the transverse axis 106 from the primary basket 110, such as at the first end 116. Bracket assembly 140 may include a main body 142 and a plurality of hinge assemblies 144. The hinge assemblies 144 may be spaced apart in a linear array along the transverse axis 106. In exemplary embodiments, the hinge assemblies 144 are stepped along the transverse axis 106. In these embodiments, the linear array of the hinge assemblies 144 is angled relative to the transverse axis 106, rather than being directed along or parallel to the transverse axis 106. At least the portion of the main body 142 which includes the hinge assemblies 144 may also be so angled. Such angle may be between the transverse axis 106 and the longitudinal axis 102, as shown.

As shown in FIGS. 2 and 3, organizer assemblies 30 in accordance with the present disclosure may include a second basket 150 which may be rotatably and removably connectable to the bracket assembly 140. FIGS. 2 and 3 illustrate the secondary basket 150 rotatably connected to the bracket assembly 140. In exemplary embodiments, the secondary basket 150 may be connected to the bracket assembly 140 below the plurality of hinge assemblies 144 along the transverse axis 106, such as between the plurality of hinge assemblies 144 (such as the lower-most hinge assembly 144) and the interior surface 114 of the primary basket 110 along the transverse axis 106. The secondary basket 150 may be rotatable between a first position wherein the secondary basket 150 is aligned along the longitudinal axis 102 and a second position wherein the secondary basket 150 is aligned along the transverse axis 106 or at an angle between the longitudinal axis 102 and transverse axis 106 (as shown in FIGS. 2 and 3). In exemplary embodiments, the secondary basket 150 may be removable, such that it can be utilized as needed for cable 42 (and transmission elements thereof) routing and set aside/discarded when not needed.

The secondary basket 150 includes an exterior surface 152 and an interior surface 154. The secondary basket 150 may extend (such as along the longitudinal axis 102 when in the first position) between a first end 156 and a second end 158. The first end 156 may be an open end, as shown, such that cables 42 or transmission elements thereof being directed along and parallel to the longitudinal axis 102 can enter or exit an interior 160 of the secondary basket 150 through the first end 156, when the secondary basket 150 is in the first position. The second end 158 may be a closed end, as shown, such that cables 42 or transmission elements thereof being directed along and parallel to the longitudinal axis 102 cannot enter an interior 160 of the secondary basket 150 through the second end 158, and instead encounter a surface of the primary basket 110, when the secondary basket 150 is in the first position.

The secondary basket 150 may further extend along the lateral axis 104 between a first side 162 and a second side 164, both of which may be closed (as discussed above with respect to second end 118). In exemplary embodiments, a length between the first end 156 and second end 158 is greater than a length between the first side 162 and the second side 164. Further, in exemplary embodiments, transitions between the closed second end 158 portion and a base portion 166, the closed first side portion 162 and the base portion 166, the closed second side portion 164 and the base portion 166, the closed second end 158 portion and closed first side portion 162, and/or the closed second end 158 portion and closed second side portion 164 are curved.

In exemplary embodiments, the area of the interior 160 may be less than the area of the interior 120, the length between the first end 156 and second end 158 may be less than the length between the first end 116 and second end 118, and/or the length between the first side 162 and second side 164 is less than the length between the first side 122 and second side 124, such that the secondary basket 150 can fit at least partially within the primary basket 110 (such as the interior 120 thereof).

Secondary basket 150 may further include an upper peripheral lip 168, which may extend between the first end 156 and second end 158, such as on the sides 162, 164, and may further extend between the sides 162, 164, such as along the closed second end 158. For example, the lip 168 may extend along an upper edge (along the traverse axis 106) of the secondary basket 150, such as along the sides 162, 164 and second end 158.

In some embodiments, basket 150 may further include a plurality of retainer tabs 172, each of which extends from the basket 150 into the interior 160. The tabs 172 may be connected to the basket 150 at the upper edge of the basket 150, such as adjacent the lip 168. Tabs 172 may generally assist in routing and retaining cables 42 and transmission elements in the interior 160 during assembly, splicing, etc., thereof.

One or more connector arms 174 may extend from the first end 156 (such as along the longitudinal axis 102 when the secondary basket 150 is in the first position). The connector arms 174 may be removably connected to the bracket assembly 140, thus rotatably connecting the secondary basket 150 thereto. For example, protrusions 176 provided on the arms 174 may be inserted in depressions 178 defined in the main body 142 to rotatably connect the secondary basket 150 thereto.

Referring again to FIGS. 2 through 4 and 6 through 8, each hinge assembly 144 may include at least one positioning tab 180 and at least one release tab 182. In some embodiments, for example, each hinge assembly 144 may include two positioning tabs 180 and a release tab 182, with the release tab 182 disposed between the positioning tabs 180 along the lateral axis 104. Each positioning tab 180 may be a generally tapered protrusion extending along the transverse axis 106 from the main body 142. Each release tab 182 may extend along the longitudinal axis 102 from the main body 142, and may thus protrude from the main body 142 farther than the positioning tab(s) 180 along the longitudinal axis 102.

Each bracket assembly 144 may further include one or more depressions 184 (which may for example be through-holes) defined in the main body 142.

Referring now to FIGS. 5 through 8 and 12 through 14, organizer assemblies 30 in accordance with the present disclosure may further include one or more organizer trays 200, such as in exemplary embodiments a plurality of organizer trays 200.

Figure 5:
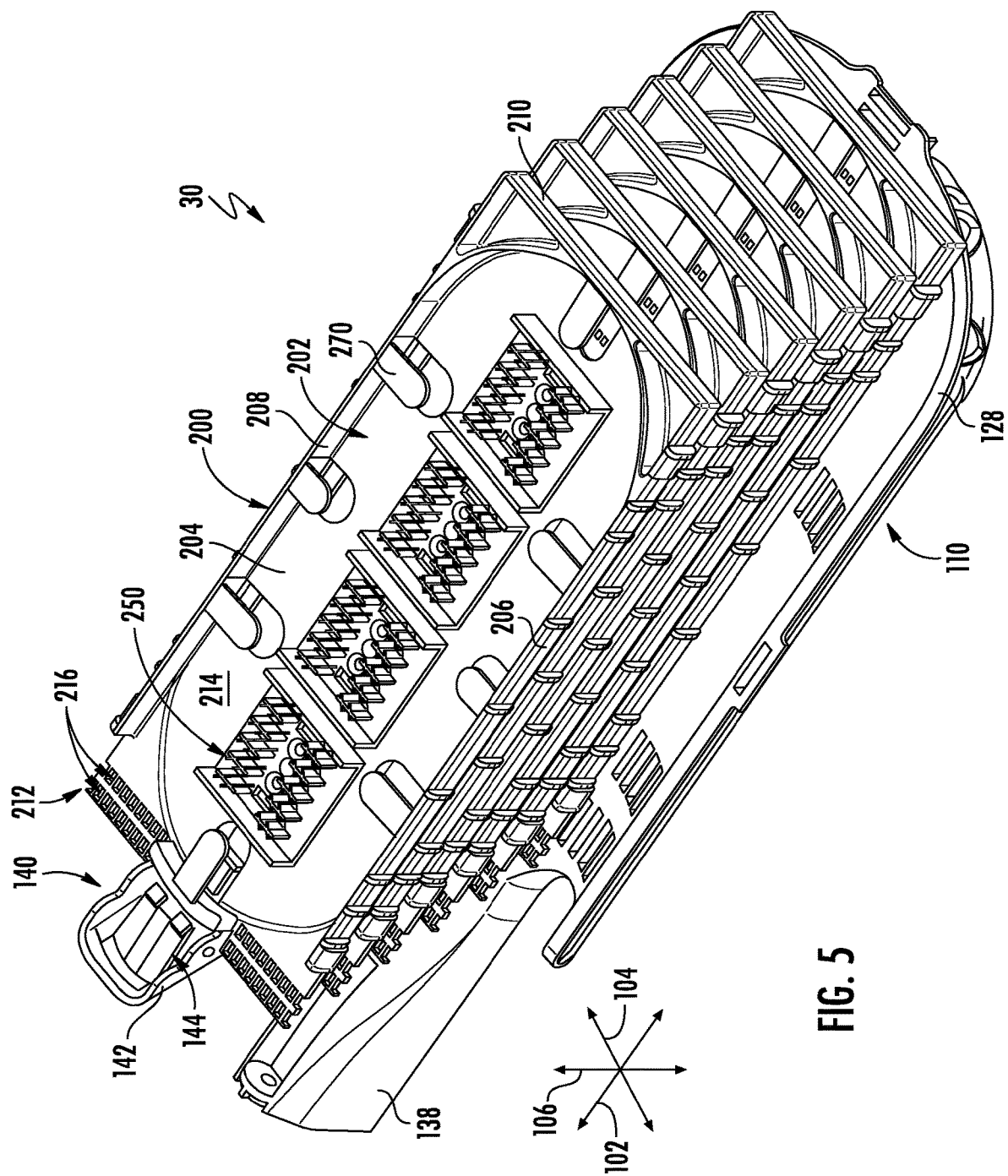
FIG. 5 is a perspective view of an organizer assembly, with a plurality of organizer trays connected thereon in first positions, in accordance with embodiments of the present disclosure.
Figure 6:
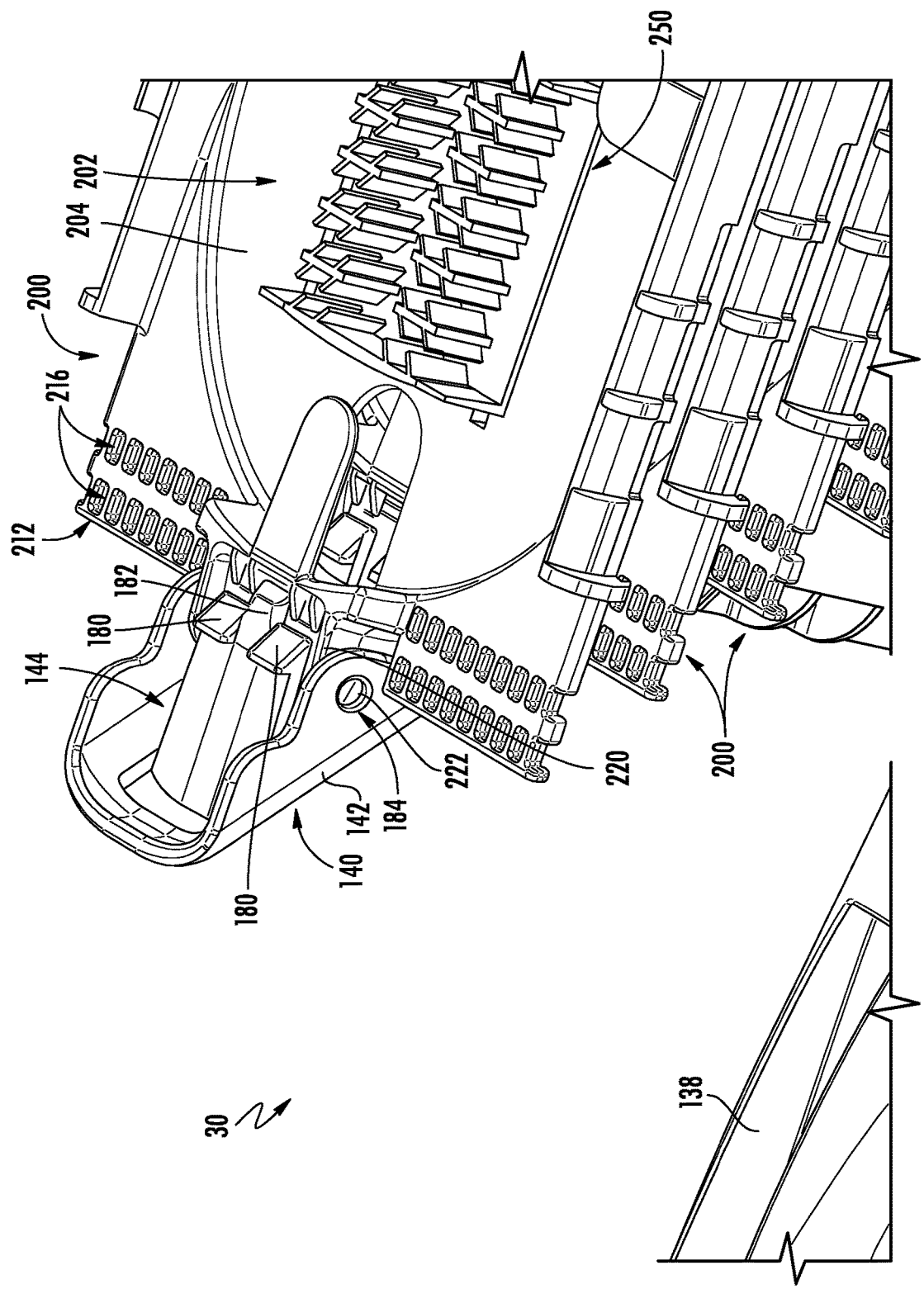
FIG. 6 is a perspective view of a portion of an organizer assembly, illustrating hinge assemblies and organizer trays with the organizer trays in first positions, in accordance with embodiments of the present disclosure.
Figure 7:
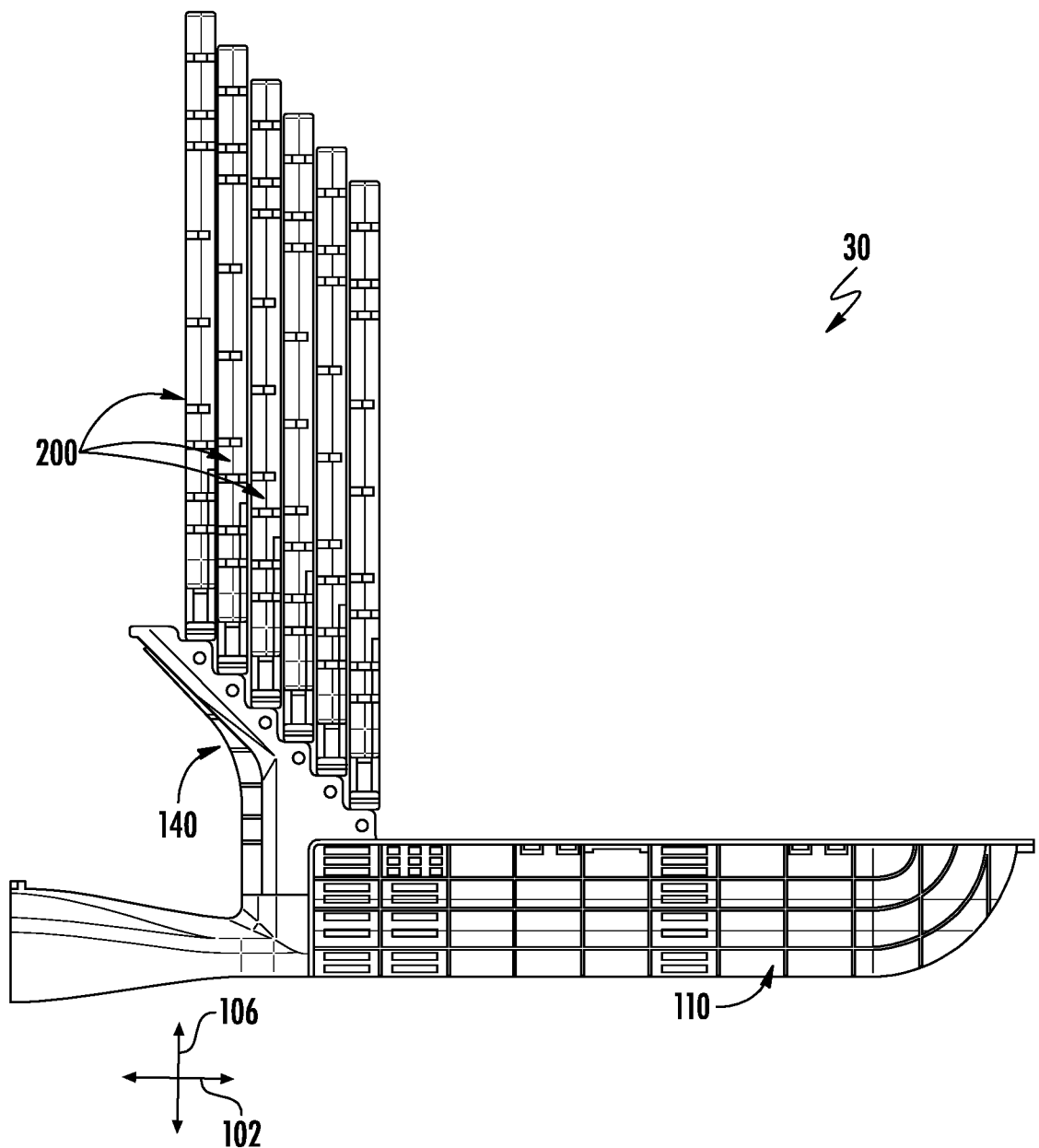
FIG. 7 is a side view of an organizer assembly, with a plurality of organizer trays connected thereon in second positions, in accordance with embodiments of the present disclosure.
Figure 8:
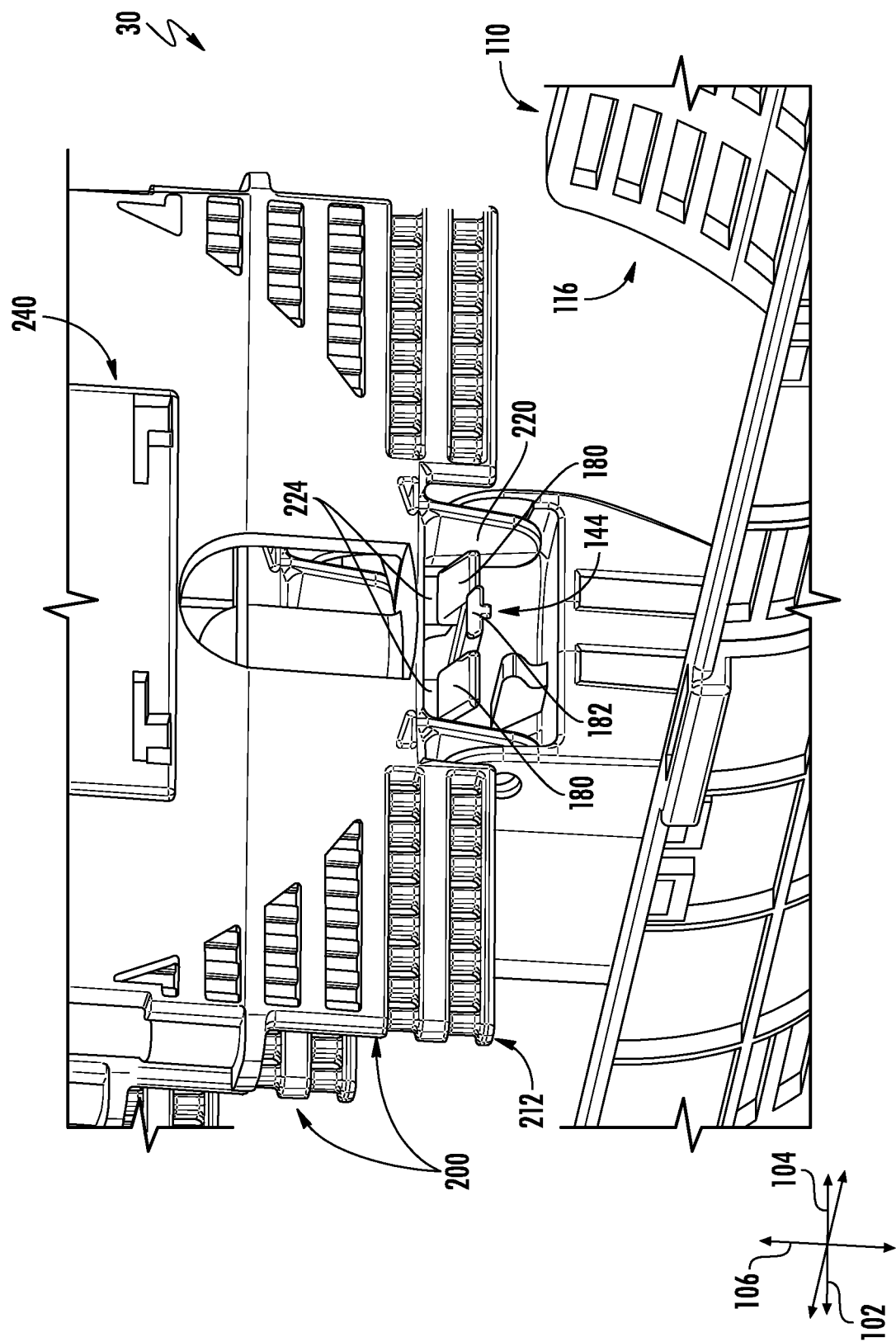
FIG. 8 is a perspective view of a portion of an organizer assembly, illustrating hinge assemblies and organizer trays with the organizer trays in second positions, in accordance with embodiments of the present disclosure.
Figure 12:
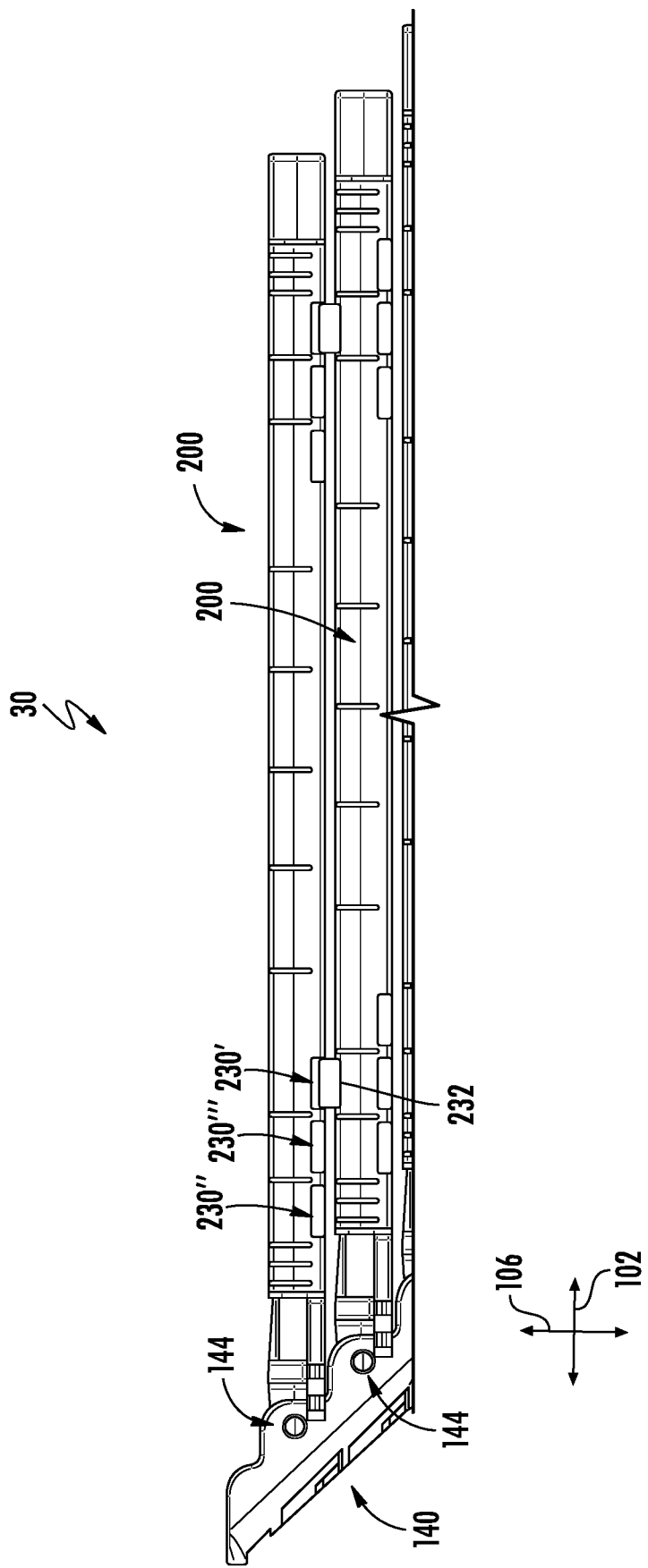
FIG. 12 is a side view of organizer trays in first positions in accordance with embodiments of the present disclosure.
Figure 13:
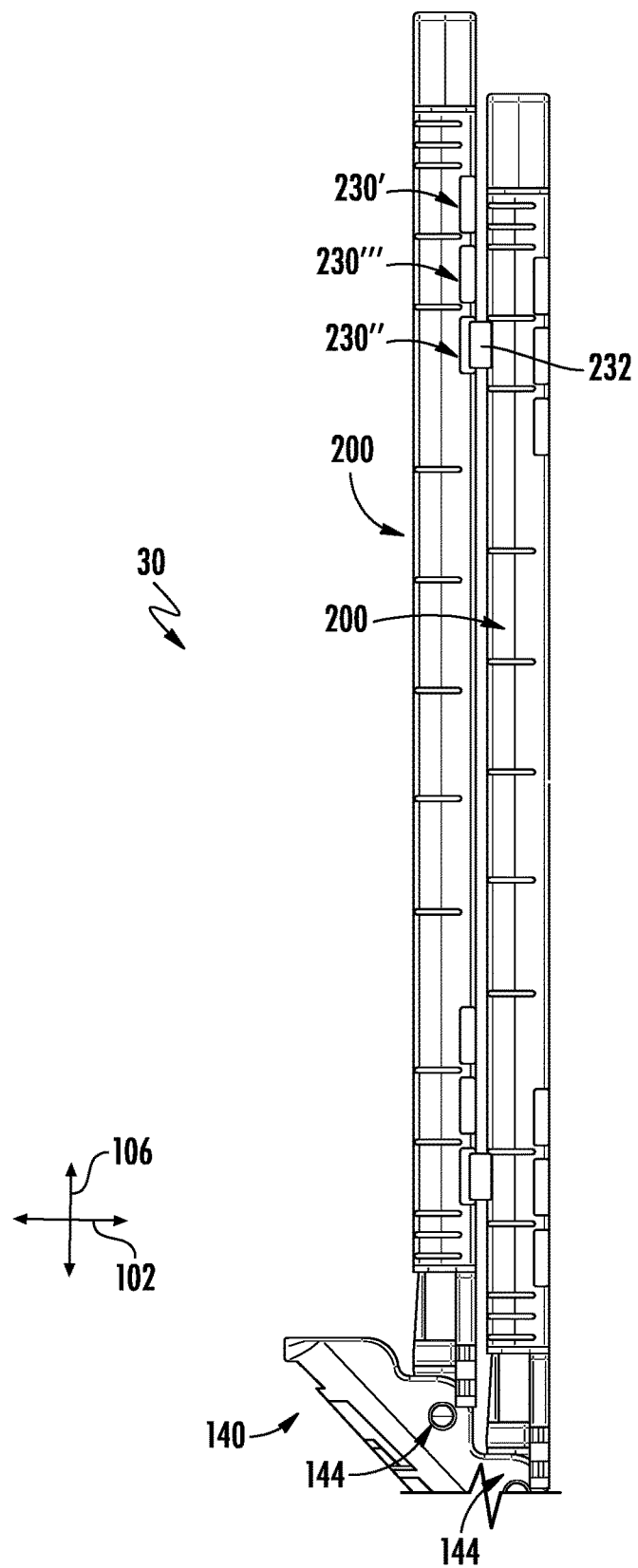
FIG. 13 is a side view of organizer trays in second positions in accordance with embodiments of the present disclosure.

Each organizer tray 200 is rotatably connectable, and thus may be rotatably connected, to the bracket assembly 140, such as to one of the plurality of hinge assemblies 144. Each organizer tray 200 may be rotatable, such as between a first position wherein the organizer tray 200 is aligned along the longitudinal axis 102 (as shown in FIGS. 5, 6, and 12) and a second position wherein the organizer tray 200 is aligned along the transverse axis 106 (as shown in FIGS. 7, 8, and 13).

For example, each organizer tray 200 may include a main body 202. Main body 202 may, for example, include a base wall 204, a first sidewall 206, a second sidewall 208, and a front wall 210, and may further define a rear end 212. First sidewall 206 and second sidewall 208 may be spaced apart along the lateral axis 104. Front wall 210 and rear end 212 may be spaced apart (such as along the longitudinal axis 102 when in the first position). The rear end 212 may be an open end, as shown, such that cables 42 or transmission elements thereof being directed along and parallel to the longitudinal axis 102 can enter or exit an interior 214 of the organizer tray 200 through the rear end 212, when the organizer tray 200 is in the first position. The front wall 210 and sidewalls 206, 208 may define a closed end and closed sides.

In some embodiments, a plurality of apertures 216 may be defined in the base wall 204, such as at the rear end 212. Each aperture 216 may be utilized to secure a cable 42 (or transmission element thereof) directly to the base wall 204 and organizer tray 200 thereof, such as using a suitable zip-tie or other suitable fastener. Notably, no additional cable/transmission element securement components are included on the organizer tray 200.

Organizer tray 200 may further include one or more connector arms 220 which may extend from the main body 202. For example, each connector arm 220 may extend from the base wall 204, such as along the transverse axis 106 when in the first position. The connector arms 220 may be removably connected to the hinge assembly 144, thus rotatably connecting the organizer tray 200 thereto. For example, protrusions 222 provided on the arms 220 may be inserted in depressions 184 to rotatably connect the organizer tray 200 to the hinge assembly 144.

As discussed, each of the plurality of organizer trays 200 may be rotatable between a first position and a second position. Further, each organizer tray 200 may advantageously be releasably securable in the second position, thus facilitating efficient loading of cables 42 and transmission elements thereof, splicing, etc., into other organizer trays 200 and the assembly 30 generally. The hinge assembly 144 which rotatable connects the organizer tray 200 to the bracket assembly 140 may releasably secure the organizer tray 200 in the second position.

For example, in exemplary embodiments as illustrated in FIG. 8, the one or more positioning tabs 182 of the associated hinge assembly 144 may contact and releasably secure the organizer tray 200 in the second position. In some embodiments, the organizer tray 200 may include one or more contact tabs 224, each of which extends from the rear end 212 of the body 202. When the organizer tray 200 is moved to the second position, each contact tab 224 may contact a positioning tab 182 and releasably secure the organizer tray 200 in the second position. For example, each contact tab 224 may ride up the tapered front surface of a positioning tab 182 and then rest in contact with a rear surface of the positioning tab 182 when the organizer tray 200 reaches the second position.

Further, in exemplary embodiments, the organizer tray 200 may be released from being secured in the second position to move from the second position to the first position. For example, movement of the release tab 182 may cause movement of the positioning tab(s) 180 out of contact with the organizer tray 200 (such as the contact tab(s) 224) thereof such that the organizer tray 200 can move from the second position to the first position. In exemplary embodiments, a user may apply force to the release tab 182 to cause such movement. For example, such force may pivot the release tab 182 and, due to a material connection between the release tab 182 and positioning tab(s) 180, also cause pivoting of the positioning tab(s) 180.

Figure 14:
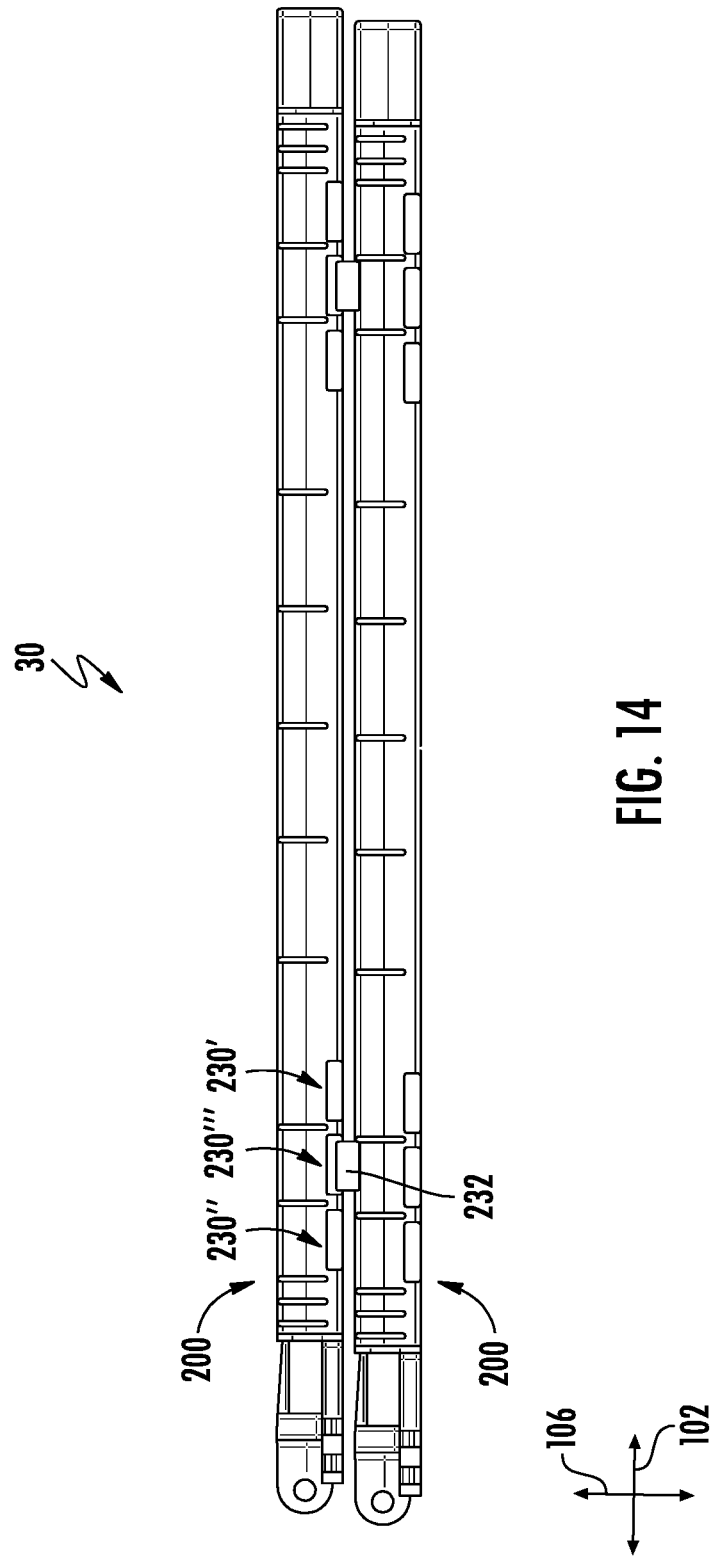
FIG. 14 is a side view of organizer trays removed and stacked in accordance with embodiments of the present disclosure.

Referring now in particular to FIGS. 12 through 14, each organizer tray 200 may advantageously include features for ensuring and securing proper positioning of the organizer trays 200 relative to each other in the first and second positions. For example, each organizer tray 200 may include one or more pluralities of positioning slots 230 and one or more positioning tabs 232. The slots 230 may, for example, be defined in exterior surfaces of the first sidewall 206 and/or second sidewall 208, such as adjacent or at the base wall 204. The positioning tab(s) 232 may extend from the first sidewall 206 and/or second sidewall 208, such as at a top of the organizer tray 200 opposite the base wall 204.

Advantageously, a positioning tab 232 of an organizer tray 200' may be inserted into a different positioning slot 230 of a plurality of positioning slots 230 in a neighboring organizer tray 200" depending on the positions of the organizer trays 200. For example, a positioning tab 232 of an organizer tray 200' may be inserted in one of the plurality of positioning slots 230' of a neighboring organizer tray 200" when these trays 200', 200" (such as, for example, the plurality of organizer trays 200) is in the first position (see FIG. 12). The positioning tab 232 of the organizer tray 200' may be inserted in another one of the plurality of positioning slots 230" of the neighboring organizer tray 200" when these trays 200', 200" (such as, for example, the plurality of organizer trays 200) is in the second position (see FIG. 13).

As discussed, in some embodiments the organizer trays 200 may be removable from the bracket assembly 140 and organizer assembly 30 generally. In some embodiments, the positioning tab 232 of the organizer tray 200' may further be inserted in yet another one of the plurality of positioning slots 230''' of the neighboring organizer tray 200" when these trays 200', 200" (such as, for example, the plurality of organizer trays 200) are removed from the bracket assembly 140 and stacked together, such as in a vertical array (see FIG. 14). Accordingly, organization and retention of the organizer trays 200 is advantageously facilitated even when the organizer trays 200 are not connected to the bracket assembly 140 and organizer assembly 30 generally.

Figure 9:
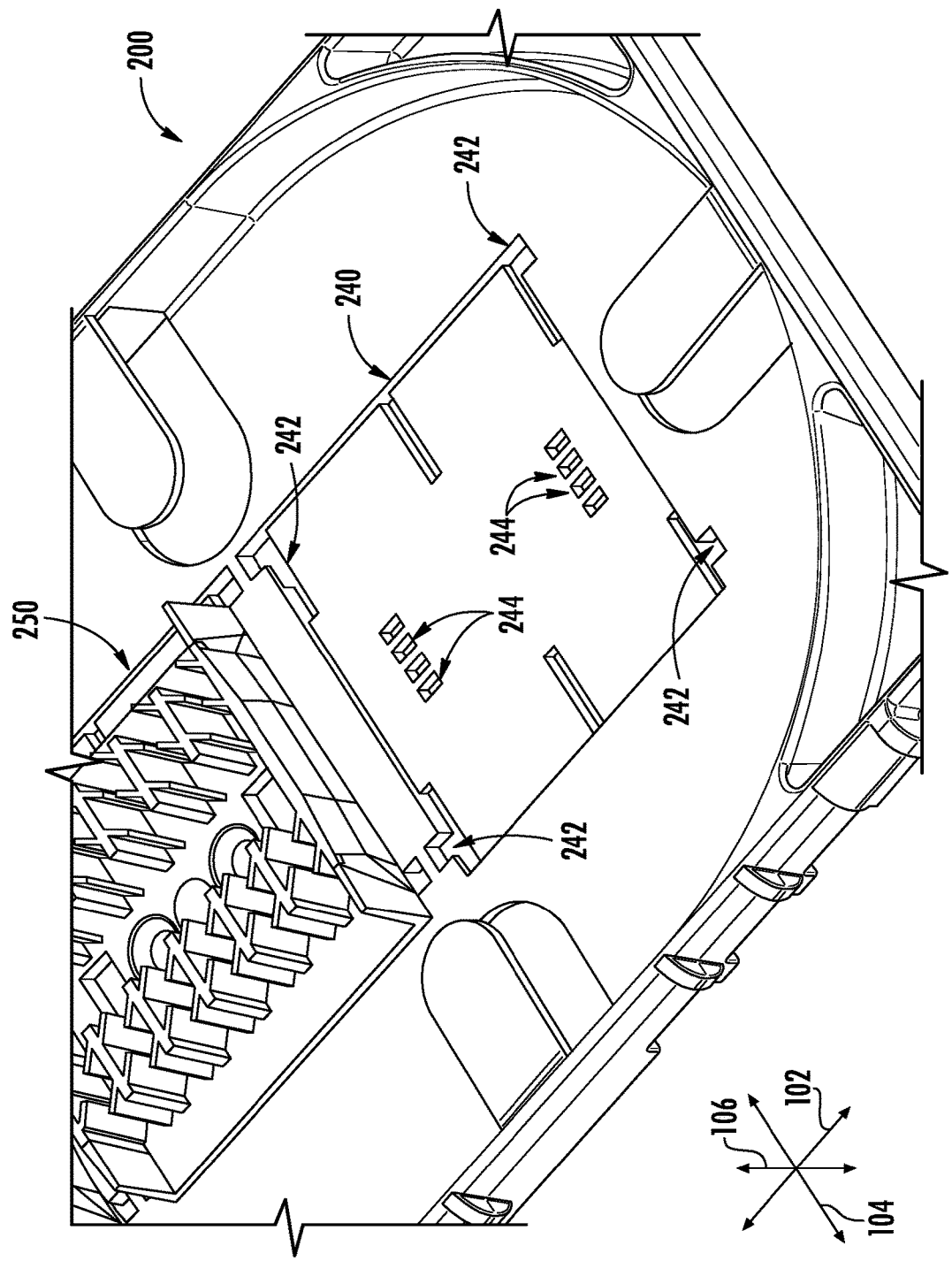
FIG. 9 is a perspective view illustrating a module mounting location in accordance with embodiments of the present disclosure.
Figure 10:
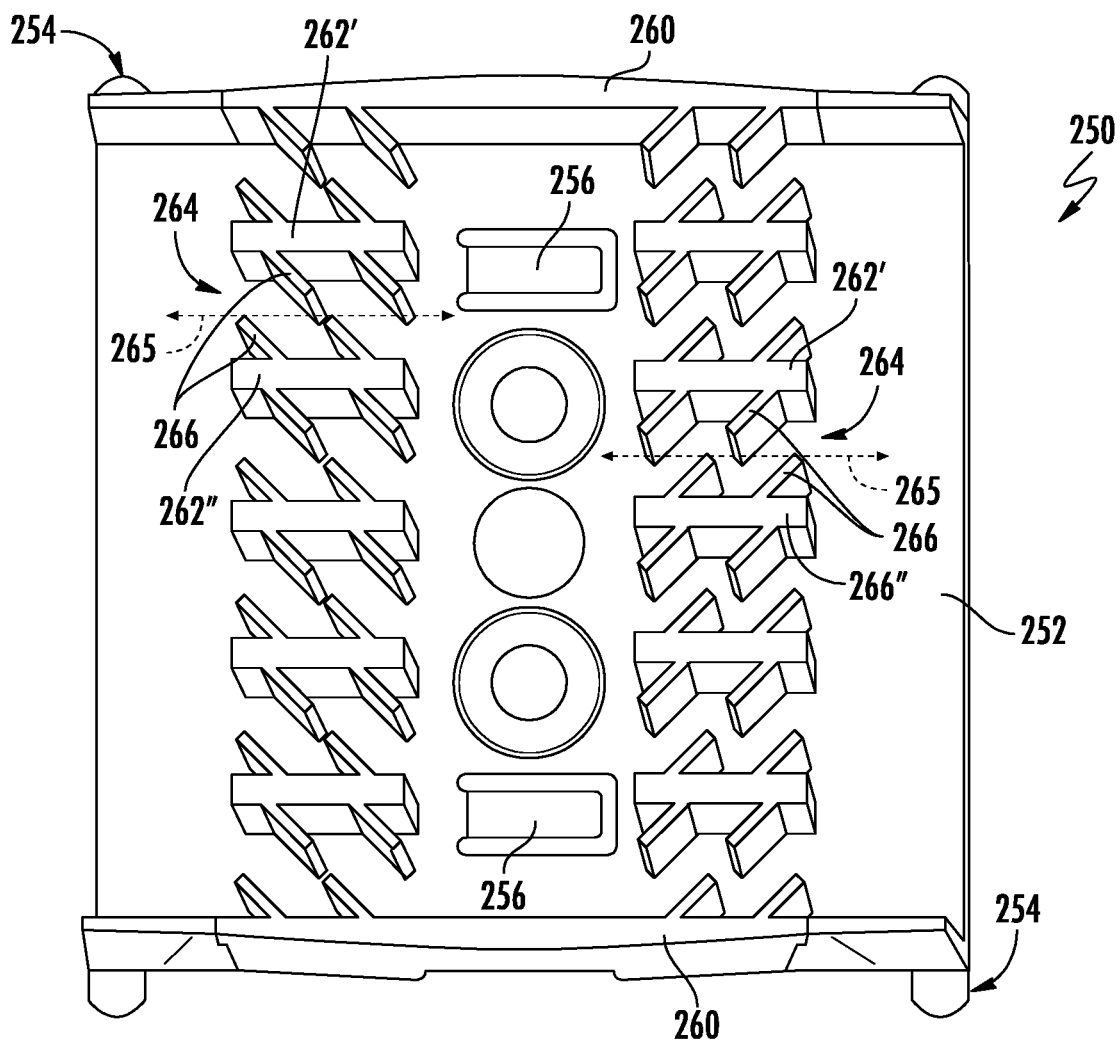
FIG. 10 is a perspective view of a splice module in accordance with embodiments of the present disclosure.
Figure 11:
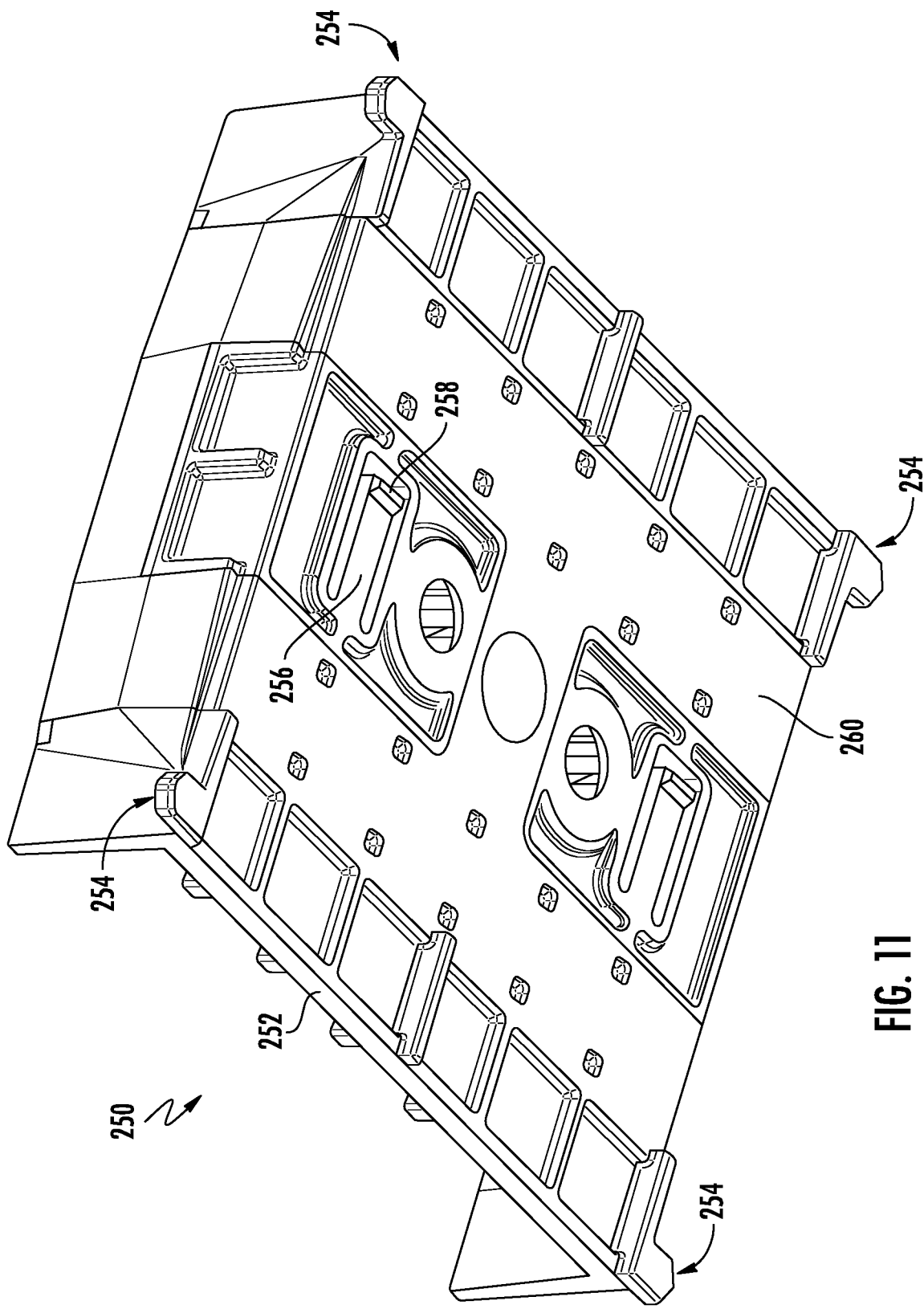
FIG. 11 is a bottom perspective view of a splice module in accordance with embodiments of the present disclosure.

Referring now in particular to FIGS. 9 through 11, each organizer tray 200 may generally accommodate one or more splice modules 250. Each splice module 250 may be removable connected to the organizer tray 200, such as to the base wall 204 thereof. For example, base wall 204 may include a plurality of module mounting locations 240. In exemplary embodiments, each of the module mounting locations 240 may include a plurality of leg slots 242 which may be defined through the base wall 204 and one or more pluralities of positioning slots 244 which may be defined through the base wall 204. The leg slots 242 may, for example, define at least a portion of a periphery of the module mounting location 240, and may for example, be disposed at corners of the module mounting location 240. Each plurality of positioning slots 244 may be defined within the periphery of the module mounting location 240, and may for example extend in a linear array. The leg slots 242 and positioning slots 244 may generally facilitate removable connection of a splice module 250 to the organizer tray at a module mounting location 240.

Each splice module 250 may, for example, include a base 252 and a plurality of legs 254 extending from the base 252, such as below the base 252 as shown. The legs 254 may further extend from and at least partially define a periphery of the base 252, and may further be disposed at corners of the base 252. To removably connect a splice module 250 to an organizer tray 200 at a module mounting location 240, each leg 254 may be inserted into one of the leg slots 242 of a module mounting location 240. Further, a splice module 250 may include one or more cantilevered arms 256 extending from the base 252, such as below the base 252 as shown. Each cantilevered arm 256 may include a tab 258 at a distal end thereof. To removably connect a splice module 250 to an organizer tray 200 at a module mounting location 240, the cantilevered arm 256, such as the tab 258 thereof, may be inserted in one of a plurality of positioning slots 244 of a module mounting location 240.

In exemplary embodiments, a splice module 250 may be removably connectable to an organizer tray 200, such as at a module mounting location 240, in multiple different orientations. For example, the plurality of positioning slots 244 may be oriented such that the cantilevered arm 256, such as the tab 258 thereof, may be inserted in a different one of a plurality of positioning slots 244 depending on the orientation of the splice module 250.

Splice modules 250 in accordance with the present disclosure may advantageously be dual material components. For example, splice modules 250 may further include one or more overmolded portions 260 which are disposed on portions of the base 252, such as on a lower surface and sidewalls thereof. The overmolded portions 260 advantageously provide improved structural integrity, rigidity, and protection. The base 252, as well as the legs 254 and cantilevered arms 256 thereof, may for example, be formed from a hard plastic such as polycarbonate or nylon. The overmolded portions 260 may be formed from suitable elastomers, such as vulcanized elastomers.

Splice modules 250 in accordance with the present disclosure may further include a plurality of partitions 262, each of which may extend from the base 252. The partitions 262 may be generally parallel to each other, and neighboring partitions 262 may define channels 264 therebetween. Each channel 264 may define and extend along a longitudinal channel axis 265, as shown. Further, one or more arms 266 may extend from one or more of the neighboring partitions 262 into one or more of the channels 264 defined by such neighboring partitions 262. Such arms 266 may extend into the channels 264 at an angle to the longitudinal channel axis 265, as shown. For example, a first partition 262' of neighboring partitions 262 may include one or more arms 266 extending into a channel 264 defined by the neighboring partitions 262, and a second partition 262" of neighboring partitions 262 may include one or more arms 266 extending into the channel 264 defined by the neighboring partitions 262. Further, in exemplary embodiments as shown, the one or more arms 266 extending into a channel 264 from a first partition 262' may extend in a direction opposite the direction of the one or more arms 266 extending into the channel 264 from a second partition 262".

In exemplary embodiments, partitions 262 and arms 266 of splice modules 250 may be formed from suitable elastomers, such as vulcanized elastomers.

Splice modules 250 in accordance with the present disclosure, and in particular the configuration of the partitions 262 and arms 266, are particularly advantageous due to their versatility and flexibility in accommodating various components. For example, a channel 264 of a splice module 250 may be capable of holding triple-stacked single spliced transmission elements, double-stacked ribbon spliced transmission elements, mechanical splices, splitter modules from 1:2 to 1:32, PLCs, etc.

Organizer trays 200 may further include one or more retainer tabs 270, each of which may extend from a wall, such wall 206, 208, or 210, into the interior 214. Such retainer tabs 270 may generally assist in routing and retaining cables 42 and transmission elements in the interior 214 during assembly, splicing, etc., thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An organizer assembly for a butt closure, the organizer assembly defining a mutually orthogonal coordinate system comprising a longitudinal axis, a lateral axis, and a transverse axis, the organizer assembly comprising:
    an organizer tray, the organizer tray rotatably connectable to a hinge assembly, wherein the organizer tray is rotatable between the longitudinal axis and the transverse axis; and
    a splice module connected to the organizer tray, wherein the splice module comprises a base and a plurality of partitions extending from the base, and wherein neighboring partitions of the plurality of partitions define a channel therebetween, wherein the channel defines a longitudinal channel axis, wherein the splice module comprises an arm extending from each neighboring partition into each channel defined by the neighboring partition at an angle to the longitudinal channel axis.

2. The organizer assembly of claim 1, wherein the arm extends into the channel from a first partition of the neighboring partitions in a direction opposite a direction of the arm extending into the channel from a second partition of the neighboring partitions.

3. The organizer assembly of claim 1, wherein the splice module is removably connected within the organizer tray.

4. The organizer assembly of claim 3, wherein the splice module includes an overmolded portion.

5. The organizer assembly of claim 1, wherein the splice module comprises an overmolded portion disposed on the base.

6. The organizer assembly of claim 5, wherein the overmolded portion comprises an elastomer.

7. The organizer assembly of claim 6, wherein the splice module comprises a plurality of legs and a cantilevered arm, and wherein one or more of the base, the plurality of legs, or the cantilevered arm is formed from a hard plastic.

8. The organizer assembly of claim 1, further comprising:
a primary basket extending along the longitudinal axis between a first open end and a second closed end, the primary basket defining an interior.

9. The organizer assembly of claim 8, wherein the primary basket comprises an upper peripheral lip extending between the first end and the second end, and wherein the primary basket further comprises a retainer tab, wherein the retainer tab is connectable to the primary basket adjacent the upper peripheral lip.

10. The organizer assembly of claim 8, the organizer assembly comprising:
a bracket assembly extending along the transverse axis at the first open end of the basket, the bracket assembly comprises the hinge assembly.

11. The organizer assembly of claim 10, comprising a secondary basket rotatably connectable to the bracket assembly below the hinge assembly along the transverse axis.

12. The organizer assembly of claim 1, wherein the hinge assembly comprises a positioning tab and a release tab, wherein the organizer tray contacts and is releasably secured in a position non-aligned with the longitudinal axis by the positioning tab of the hinge assembly.

13. The organizer assembly of claim 1, wherein the organizer tray comprises a base wall, and wherein the base wall comprises a module mounting location, wherein the module mounting location comprises a leg slot defined through the base wall and a positioning slot defined through the base wall.

14. The organizer assembly of claim 13, wherein the splice module comprises a leg extending below the base and a cantilevered arm extending below the base, the cantilevered arm comprising a tab, and wherein the leg is inserted in the leg slot and the tab is inserted in the positioning slot to removably connect the splice module to the organizer tray.

15. An organizer assembly for a butt closure, the organizer assembly defining a mutually orthogonal coordinate system comprising a longitudinal axis, a lateral axis, and a transverse axis, the organizer assembly comprising:
an organizer tray, the organizer tray rotatably connectable to a hinge assembly, wherein the organizer tray is rotatable between the longitudinal axis and the transverse axis, the organizer tray comprising a base wall, and wherein the base wall comprises a module mounting location, wherein the module mounting location comprises a leg slot defined through the base wall and a positioning slot defined through the base wall; and
a splice module removably connected to the organizer tray at the leg slot, wherein the splice module comprises a base and a plurality of partitions extending from the base, and wherein neighboring partitions of the plurality of partitions define a channel therebetween, wherein the channel defines a longitudinal channel axis.

16. The organizer assembly of claim 15, comprising a plurality of organizer trays, wherein each of the plurality of organizer trays comprises a plurality of positioning slots and a positioning tab, wherein the positioning tab of one of the plurality of organizer trays is inserted in one of the plurality of positioning slots of a neighboring organizer tray when the plurality of organizer trays is in a first position aligned with the longitudinal axis, and wherein the positioning tab of the one of the plurality of organizer trays is inserted in another one of the plurality of positioning slots of the neighboring organizer tray when the plurality of organizer trays is in a second position non-aligned with the longitudinal axis.

17. The organizer assembly of claim 16, wherein the positioning tab of one of the plurality of organizer trays is inserted in yet another one of the plurality of positioning slots of the neighboring organizer tray when the plurality of organizer trays is removed from the bracket assembly and stacked together.

18. The organizer assembly of claim 15, wherein the splice module comprises an arm extending from each neighboring partition into each channel defined by the neighboring partition at an angle to the longitudinal channel axis.

19. The organizer assembly of claim 18, wherein the arm extends into the channel from a first partition of the neighboring partitions in a direction opposite a direction of the arm extending into the channel from a second partition of the neighboring partitions.

20. An organizer assembly for a butt closure, the organizer assembly defining a mutually orthogonal coordinate system comprising a longitudinal axis, a lateral axis, and a transverse axis, the organizer assembly comprising:
an organizer tray rotatably connectable to a hinge assembly, wherein the organizer tray is rotatable between the longitudinal axis and the transverse axis; and
a splice module connected to the organizer tray, wherein the splice module comprises a base and a plurality of partitions extending from the base, and wherein neighboring partitions of the plurality of partitions define a channel therebetween, wherein the channel defines a longitudinal channel axis, wherein the splice module comprises an overmolded portion disposed on the base, wherein the overmolded portion comprises an elastomer, and wherein the splice module comprises a plurality of legs and a cantilevered arm, and wherein one or more of the base, the plurality of legs, or the cantilevered arm is formed from a hard plastic.

21. An organizer assembly for a butt closure, the organizer assembly defining a mutually orthogonal coordinate system comprising a longitudinal axis, a lateral axis, and a transverse axis, the organizer assembly comprising:
a primary basket extending along the longitudinal axis between a first open end and a second closed end, the primary basket defining an interior;
a bracket assembly extending along the transverse axis at the first open end of the basket, the bracket assembly comprising a hinge assembly;
a secondary basket rotatably connectable to the bracket assembly below the hinge assembly along the transverse axis;
an organizer tray the organizer tray rotatably connectable to the hinge assembly, wherein the organizer tray is rotatable between the longitudinal axis and the transverse axis; and
a splice module connected to the organizer tray, wherein the splice module comprises a base and a plurality of partitions extending from the base, and wherein neighboring partitions of the plurality of partitions define a channel therebetween, wherein the channel defines a longitudinal channel axis.

\* \* \* \* \*